United States Patent [19]
Speck et al.

[11] Patent Number: 5,488,860
[45] Date of Patent: Feb. 6, 1996

[54] APPARATUS FOR DETERMINING THE POSITION OF A PISTON IN A FLUIDIC ACTUATOR

[75] Inventors: Darin J. Speck; Paul G. Masters, both of Salt Lake City, Utah

[73] Assignee: E-Systems, Inc., Dallas, Tex.

[21] Appl. No.: 175,239

[22] Filed: Dec. 29, 1993

[51] Int. Cl.⁶ .......................... G01M 19/00; F16H 21/44; F16H 25/18
[52] U.S. Cl. ............................ 73/168; 116/283; 116/285; 74/102; 74/104
[58] Field of Search .................... 33/DIG. 15; 92/5 R; 73/168; 116/283, 285, 277, 281, 284; 340/686; 74/88, 102, 104

[56] References Cited

U.S. PATENT DOCUMENTS

| | | | |
|---|---|---|---|
| 1,841,568 | 1/1932 | Bradley | 74/88 X |
| 2,903,233 | 9/1959 | Magor | 74/102 X |
| 3,463,554 | 8/1969 | Bueler | 92/5 R X |
| 3,915,070 | 10/1975 | Mailliet | 116/271 X |
| 4,571,994 | 2/1986 | Dickey et al. | 73/168 |
| 4,876,531 | 10/1989 | Dondorf | 340/686 |
| 4,882,977 | 11/1989 | Himeno et al. | 92/5 R |
| 4,993,259 | 2/1991 | LaFountain | 73/168 |
| 5,000,077 | 3/1991 | Habicht | 74/104 X |

FOREIGN PATENT DOCUMENTS 3803268  4/1989  Germany ..................... 92/5 R

*Primary Examiner*—William A. Cuchlinski, Jr.
*Assistant Examiner*—Willie Morris Worth
*Attorney, Agent, or Firm*—Harold E. Meier

[57] ABSTRACT

Apparatus for determining the position of a piston in a hydraulically or pneumatically operated actuator including a fixed position, rotatable shaft having a pair of attached pins, each pin off-set from the center of the shaft. The pins are positioned on either side of a drive ring located about the circumference of the piston. When the piston moves in either direction, one of the pair of pins will remain in contact with the drive ring and cause uni-directional rotation of the shaft. In order to detect piston position, a sensor is mounted to detect shaft rotation.

14 Claims, 2 Drawing Sheets

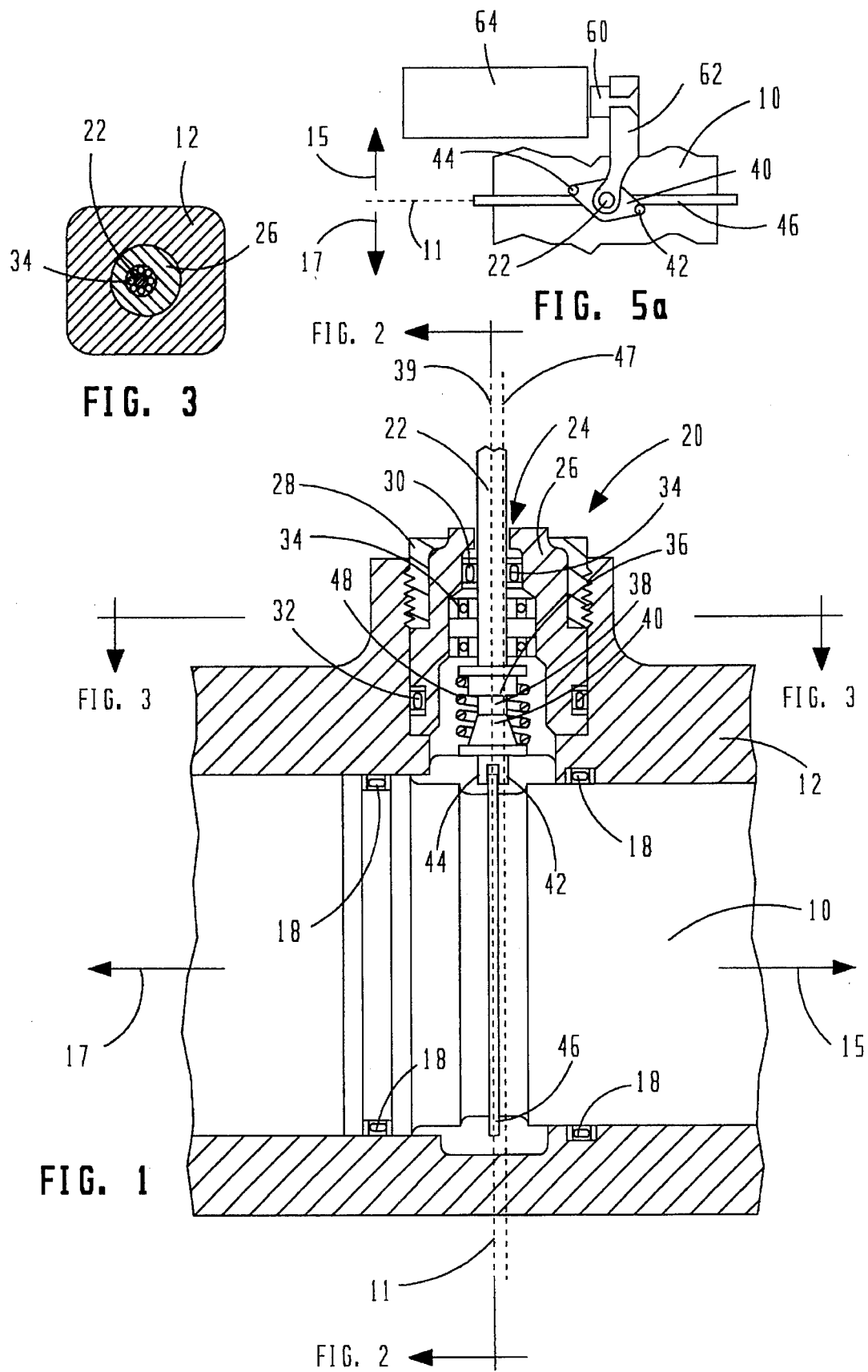

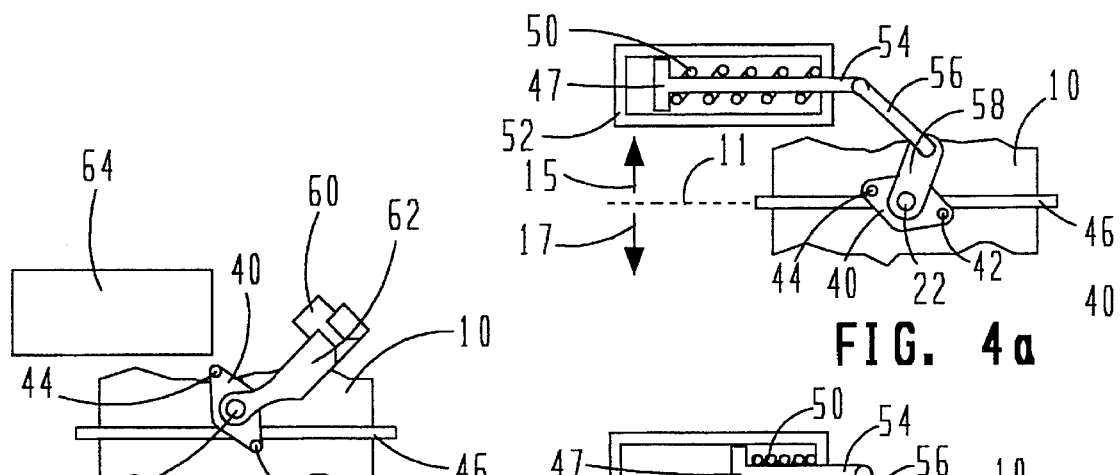
FIG. 4a
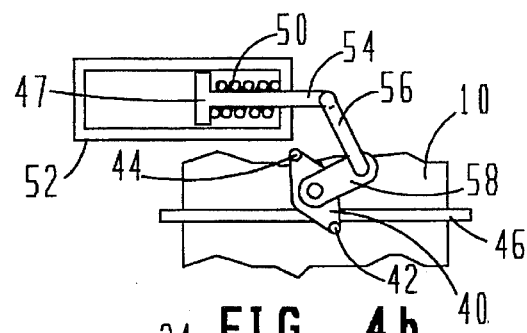
FIG. 4b
FIG. 5b
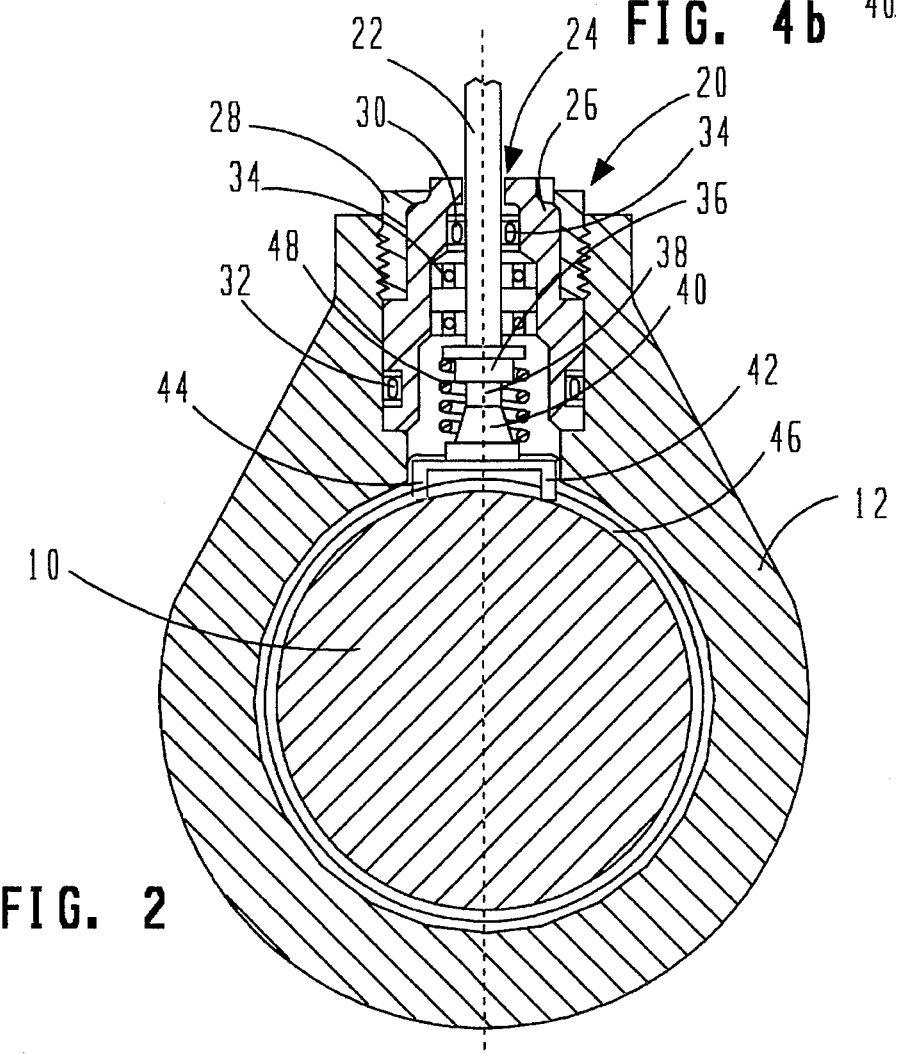
FIG. 2

5,488,860

APPARATUS FOR DETERMINING THE POSITION OF A PISTON IN A FLUIDIC ACTUATOR

TECHNICAL FIELD

The present invention relates to fluidic actuators and, in particular, to the determination of the position of a piston moved within a cylinder in response to the application of a pressurized fluid.

BACKGROUND OF THE INVENTION

Those skilled in the art are aware of numerous situations wherein the position of the piston in a hydraulically or pneumatically operated actuator needs to be accurately known. In the prior art, piston position was determined as a function of the position of the load affected by the operation of the actuator. Such position detectors, however, were often mechanically complicated, rigid in application and subject to failure. Accordingly, the prior art further discloses the use of mechanisms directly located on, or directly actuated by the piston for providing piston position information. Such mechanisms include slide-by type sensors, cam type sensors and detented type sensors. These position detectors, however, are undesirable due to their complexity, expense and sensitivity to pressure fluctuations within the piston cylinder. Accordingly, there is a need for a directly actuated piston position detection mechanism that isolates the sensor from the pressures within the piston cylinder.

SUMMARY OF THE INVENTION

The present invention relates to an apparatus for continuously and accurately determining the position of a piston in a hydraulically or pneumatically operated actuator. The apparatus includes a mechanism for converting linear piston movement in either direction away from a neutral piston position into uni-directional rotation which is transmitted by a shaft through the wall of the pressurized piston cylinder to a suitable indicator.

The mechanism for converting comprises a fixed position, radially extending, rotatable shaft including at one end thereof a pair of pins. Each pin is off-set from the center of shaft rotation, and the pins are positioned on either side of a drive ring located about the circumference of the piston. When the piston is at its neutral position, each pin is held by a spring in contact with a side of the drive ring. As the piston moves in either direction away from the neutral position, one of the pair of pins will remain in contact with the drive ring causing the shaft to rotate and the spring to compress. As the piston returns to the neutral position, the spring expands forcing the shaft to rotate in the opposite direction and return both pins into position in contact with the drive ring. To detect piston position, a sensor is mounted to detect shaft rotation.

BRIEF DESCRIPTION OF THE DRAWINGS

A more complete understanding of the apparatus of the present invention may be had by reference to the following Detailed Description when taken in conjunction with the accompanying Drawings wherein:

FIG. 1 is a side view, partly in cross-section, of the apparatus of the present invention;

FIG. 2 is a cross-sectional view of the apparatus of the present invention taken along lines 2—2 in FIG. 1;

FIG. 3 is a cross-sectional view of the apparatus of the present invention taken along lines 3—3 in FIG. 1;

FIGS. 4A and 4B are top views illustrating operation of the apparatus of the present invention; and FIGS. 5A and 5B are top views illustrating operation of a piston position detector in conjunction with the operation of the apparatus of the present invention.

DETAILED DESCRIPTION OF THE DRAWINGS

Reference is now made to FIGS. 1 and 2 wherein there are shown views, each partly in cross-section, of the apparatus of the present invention. A piston 10 of a hydraulically or pneumatically operated actuator is shown positioned at its neutral (i.e., locked or un-stroked) position 11 within a cylinder 12. The means by which operating fluid is supplied to the interior of the cylinder for longitudinally moving the piston 10 in either direction, as generally indicated by arrows 15 or 17, away from the neutral position 11 comprises conventional hardware that is not a part of the present invention and, therefore, is not shown in FIGS. 1 and 2. The piston 10 is sealed with respect to the inner surface of the cylinder 12 using a plurality of hydraulic seals 18.

The wall of the cylinder 12 includes an opening 20 through which a rotatably supported shaft 22 radially extends. The opening 20 is sized to receive a gland 26 with the shaft 22 passing from the interior to the exterior of the cylinder 12 through an aperture 24 in the gland 26. A threaded retainer 28 is provided to secure the gland 26 within the opening 20 of the cylinder 12. Leakage of fluid from within the cylinder 12 around the shaft 22 and through the opening 24 is resisted by a hydraulic seal 30. Similarly, a hydraulic seal 32 is provided to resist leakage of fluid from within the cylinder 12 around the gland 26 and through the opening 20. Bearings 34 are provided and secured within the gland 26 to support and allow for rotation of the shaft 22 about an axis of rotation 39.

The shaft 22 terminates within the interior of the cylinder 12 at a bracket 36. A Y-shaped bracket 40 is positioned within the cylinder 12 with respect to the piston 10 such that the bracket straddles a drive ring 46. The drive ring 46 circumferentially surrounds, and radially extends from the outer surface of the piston 10. The Y-shaped bracket 40 is connected to the bracket 36 via a shaft 38 such that the shafts 22 and 38 share the axis 39. A spring 48 is coiled around the shaft 38. The spring 48 applies force against the bracket 36 and Y-shaped bracket 40 to maintain the straddled positioning of the Y-shaped bracket 40 over the drive ring 46. The Y-shaped bracket 40 includes a pair of downwardly extending pins 42 and 44 that are secured off-set from the shared axis of rotation 39 and are oppositely positioned (by the straddling position of the Y-shaped bracket 40) on either side of the drive ring 46.

As may be seen more clearly with reference to FIGS. 1 and 3, wherein FIG. 3 shows a cross-sectional view of the apparatus of the present invention taken along lines 3—3 in FIG. 1, the shaft 22 is eccentrically positioned with respect to a center axis 47 for the opening 20. By loosening the retainer 28 and rotating the gland 26 within the opening 20 about the center axis 47, the position of the axis 39 and shaft 22 within the opening 20 of the cylinder 12 may be adjusted such that each pin 42 and 44 of the Y-shaped bracket 40 will be adjacently placed in contact with the sides of the drive ring 46 when the piston 10 is at the neutral position 11. Such adjustment to position the pins 42 and 44 in contact with the drive ring 46 is required in order for accurate detection and measurement of piston movement in either longitudinal direction 15 or 17 away from the neutral position 11.

In accordance with the operation of the present invention, the Y-shaped bracket 40 (along with pins 42 and 44) and the drive ring 46 function to convert longitudinal movement of the piston 10 into rotary motion of the shaft 22. The shaft 38 connects Y-shaped bracket 40 to bracket 36 such that rotation of the Y-shaped bracket 40 about the shared axis 39 will result in a corresponding rotation of the shaft 22. As the piston 10 longitudinally moves in either direction 15 or 17 away from the neutral position 11 to a stroked position, the drive ring 46 will contact and apply force against one of the pins 42 or 44. In response thereto, the Y-shaped bracket 40 will rotate about the shared axis 39 resulting in a rotation of the shafts 22 and 38. The amount of rotation imparted on Y-shaped bracket 40 and shaft 22 by the moving drive ring 46 is directly proportional to the amount of longitudinal piston movement 15 or 17 away from the neutral position 11 within the cylinder 12. It will be noted that with placement of the Y-shaped bracket straddling the drive ring 46 as previously described, the shaft 22 will rotate in the same direction regardless of the longitudinal direction 15 or 17 that the piston 10 is moved away from the neutral position 11 to the stroked positions. Thus, the apparatus of the present invention converts linear piston movement in either longitudinal direction 15 or 17 away from the neutral position 11 into uni-directional shaft rotation. When the piston 10 returns from either stroked position to the neutral position 11, the shaft 22 will rotate in an opposite direction.

Reference is now made to FIGS. 4A and 4B. The apparatus of the present invention further includes a detent piston 47 and detent spring 50 positioned within a cylinder 52. A piston rod 54 for the detent piston 48 is connected by a linkage 56 to an arm 58 radially extending from the exterior end of the shaft 22. The detent spring 50 is coiled around the shaft piston rod 54 and secured within the cylinder 52. When the shaft 22 is rotated in one direction (for example, clockwise as shown in FIG. 4B) as a result of the movement of the piston 10 in either direction 15 or 17 away from the neutral position 11 to the stroked positions, the arm 58 and linkage 56 draw the detent piston 47 within the cylinder 52 towards the shaft 22 compressing the spring 50. When the piston 10 returns to its neutral position 11 from a stroked position, the compressed spring 50 applies force against the detent piston 48 (and hence arm 58) to rotate the shaft 22 in the opposite direction (counter-clockwise as shown in FIG. 4A) and return each of the pins 42 and 44 into position contacting the sides of the drive ring 46. It will, of course, be understood that the spring 50 further functions to maintain one of the pins in contact with the drive ring 46 as the piston 10 moves away from the neutral position 11.

Reference is now made to FIGS. 5A and 5B. The mechanism of the present invention facilitates the accurate determination of the position of the piston 10 within the cylinder 12. In the preferred embodiment, a target 60 is connected exterior of the cylinder 12 to the end of the shaft 22 by means of an arm 62, and a proximity detector 64 is mounted (also exterior of the cylinder 12) to detect any movement of the target resulting from rotation of the shaft. Alternatively, a cam may be mounted to the end of the shaft 22 with an electrical limit switch mounted in contact with the cam to detect cam movement as the shaft rotates. The target 60 in the preferred embodiment is positioned such that it is adjacent to the proximity detector 64 when the piston 10 is in the neutral position 11 (FIG. 5A). As the piston 10 is moved in either direction 15 or 17 away from the neutral position 11 (as shown in FIG. 5B), the shaft 22 will rotate causing the target 60 to move away from the proximity detector 64 in an amount directly proportional to the amount of longitudinal piston movement.

Although a preferred embodiment of the present invention has been illustrated in the accompanying Drawings and described in the foregoing Detailed Description, it will be understood that the invention is not limited to the embodiment disclosed, but may be modified without departing from the scope of the invention as set forth and defined by the following claims.

We claim:

1. Apparatus for converting longitudinal piston movement into rotary motion, comprising:

a cylinder;

a piston mounted for movement within said cylinder in a direction away from a neutral piston position;

shaft means extending through a side wall of the cylinder for rotation about a first axis, the shaft means having a first end interior of the cylinder and a second end exterior of the cylinder;

a drive member having opposite sides and extending from an outer side surface of the piston;

a bracket mounted to the first end of the shaft means including a pair of pins, each pin off-set from the first axis; and means surrounding said shaft means and mounted to said cylinder for positioning the shaft means and therefor the bracket to straddle said drive member with each pin positioned on an opposite side thereof, said drive member engaging one of the pins with movement of the piston in either direction away from the neutral position to product uni-directional rotation of said bracket and said shaft means about the first axis.

2. The apparatus as in claim 1 wherein the means for positioning comprises:

means for adjusting the position of the first axis to thereby position the bracket to straddle said drive member with each pin in contact with a side of the drive member when the piston is in the neutral position.

3. The apparatus as in claim 1 wherein said means for positioning includes a spring for applying a force against said bracket to maintain the straddled position of said bracket.

4. The apparatus as in claim 1 wherein said drive member comprises a drive ring circumferentially mounted to the piston.

5. Apparatus for converting longitudinal piston movement in a direction away from a neutral position into rotary motion, comprising:

a cylinder;

a piston mounted for movement within said cylinder in a direction away from a neutral piston position;

a shaft extending through a side wall of the cylinder for rotation about an axis, the shaft having a first end interior of the cylinder and a second end exterior of the cylinder;

a drive member extending from an outer side surface of the piston;

a bracket mounted to the first end of the shaft including a first pin off-set from the axis of said shaft; and means mounted to the cylinder for supporting said shaft and for positioning said shaft and said bracket to position the first pin in contact with said drive member, said drive member engaging the first pin with movement of the piston away from the neutral position to produce a rotation of said bracket and said shaft in a given direction of piston movement.

6. The apparatus as in claim 5 wherein said means for positioning includes a spring for applying a force against said bracket to maintain the position of said first pin in contact with said drive member.

7. The apparatus as in claim 5 wherein said drive member comprises a drive ring circumferentially mounted to the piston.

8. The apparatus as in claim 5 further including means responsive to rotation of the shaft for indicating piston position.

9. The apparatus as in claim 8 wherein the means for indicating comprises:

a target connected to the second end of the shaft; and a proximity sensor responsive to movement of the target.

10. The apparatus as in claim 5 wherein:

the bracket further includes a second pin mounted to said bracket opposite from the first pin and off-set from the axis of the shaft; and the means for positioning positions the bracket to straddle the drive member with the first pin positioned on one side of the drive member and the second pin positioned on an opposite side of the drive member, said drive member engaging one of the pins as the piston moves in either direction away from the neutral position to produce uni-directional rotation of said bracket and said shaft in the given direction.

11. The apparatus as in claim 10 wherein the means for positioning further comprises:

means for adjusting the position of the axis of the shaft to position said bracket to straddle said drive member with each pin in contact with the drive member when the piston is in the neutral position.

12. Apparatus for indicating longitudinal piston movement in either direction away from a neutral position, comprising:

a cylinder;

a piston mounted for movement within said cylinder in a direction away from a neutral piston position;

a shaft extending through a side wall of the cylinder for rotation about an axis, the shaft having a first end interior of the cylinder and a second end exterior of the cylinder;

a drive member extending from an outer side surface of the piston;

a bracket mounted to the first end of the shaft including a pair of pins, each pin off-set from the axis of the shaft;

means mounted to the cylinder for supporting the shaft and for positioning the bracket to straddle said drive member with each pin positioned on an opposite side thereof, said drive member engaging one of the pins with movement of the piston in either direction away from the neutral position to produce rotation of said bracket and said shaft in a given direction about the axis of the shaft;

spring means for rotating the shaft in an opposite direction from the given direction as the piston moves back to the neutral position; and means connected to the shaft and responsive to rotation of the shaft for indicating piston position.

13. The apparatus as in claim 12 wherein the means for positioning comprises:

means for adjusting the position of the axis of said shaft to position said bracket to straddle said drive member with each pin in contact with the drive member in the neutral position of the piston.

14. The apparatus as in claim 12 wherein the means for indicating comprises:

a target connected to the second end of the shaft; and a proximity sensor for sensing movement of the target.

* * * * *